US012603466B2

(12) United States Patent
Lovell et al.

(10) Patent No.: US 12,603,466 B2
(45) Date of Patent: Apr. 14, 2026

(54) AXIALLY ADJUSTABLE LENGTH RADIO FREQUENCY INTERCONNECT

(71) Applicant: NORTHROP GRUMMAN SYSTEMS CORPORATION, Falls Church, VA (US)

(72) Inventors: Philip A.L. Lovell, Laurel, MD (US); Michael R. Cortina, Catonsville, MD (US); Curt E. Forst, Abington, PA (US); Eric Anders Lindquist, Severn, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 417 days.

(21) Appl. No.: 18/478,167

(22) Filed: Sep. 29, 2023

(65) Prior Publication Data

US 2025/0112425 A1 Apr. 3, 2025

(51) Int. Cl.

| | |
|---|---|
| ***H01R 24/40*** | (2011.01) |
| ***H01R 9/05*** | (2006.01) |
| ***H01R 13/631*** | (2006.01) |
| *H01R 13/622* | (2006.01) |
| *H01R 103/00* | (2006.01) |

(52) U.S. Cl.

CPC ........... *H01R 24/40* (2013.01); *H01R 9/0518* (2013.01); *H01R 9/0521* (2013.01); *H01R 13/6315* (2013.01); *H01R 13/622* (2013.01); *H01R 2103/00* (2013.01)

(58) Field of Classification Search

CPC .... H01R 24/40; H01R 9/0518; H01R 9/0521; H01R 13/6315; H01R 13/622; H01R 2103/00

USPC .................................................. 439/578, 310

See application file for complete search history.

(56) References Cited

U.S. PATENT DOCUMENTS 7,153,159 B2 12/2006 Burris et al.
7,180,392 B2 2/2007 Grothen et al.
(Continued)

FOREIGN PATENT DOCUMENTS

CN 107735910 B * 7/2021 ........... H01R 24/005
CN 216214643 U 4/2022
(Continued)

OTHER PUBLICATIONS

Machine translation of CN 107735910 (Year: 2021).*
(Continued)

*Primary Examiner* — Tulsidas C Patel
*Assistant Examiner* — Thomas K Quigley
(74) *Attorney, Agent, or Firm* — Tarolli, Sundheim, Covell & Tummino LLP

(57) ABSTRACT

An axially adjustable length radio frequency (RF) interconnect for facilitating the transmission of RF signals between RF components within an assembly such as an antenna system. An integral threading structure including a coupling nut and floating pin extends the RF interconnect to alleviate axial misalignment between components. A hollow threaded shank having a partially hollow center conductor allows the floating pin to translate within the center conductor upon radial movement of the coupling nut. A coaxial connector is employed on both ends to transfer the RF energy.

17 Claims, 6 Drawing Sheets

(56) References Cited

U.S. PATENT DOCUMENTS

| | | | | |
|---|---|---|---|---|
| 7,277,025 | B2 * | 10/2007 | Allan | E21B 17/028 340/854.8 |
| 9,048,599 | B2 | 6/2015 | Burris | |
| 9,112,323 | B2 * | 8/2015 | Goebel | H01R 4/48 |
| 2006/0073722 | A1 * | 4/2006 | Allan | H01F 38/14 439/246 |
| 2007/0024522 | A1 * | 2/2007 | Lee | H01Q 1/084 343/702 |
| 2016/0020534 | A1 * | 1/2016 | Paynter | H02G 1/14 439/578 |

FOREIGN PATENT DOCUMENTS

| | | | | | |
|---|---|---|---|---|---|
| CN | 217239838 | | | 8/2022 | |
| KR | 20120035506 | A | * | 4/2012 | H01R 13/646 |
| KR | 1020120035506 | A | | 4/2012 | |

OTHER PUBLICATIONS

Machine translation of KR20120035506 (Year: 2012).*
WOISR (Notification of Transmittal of the International Search Report and the Written Opinion of the International Search Authority) mailed Oct. 30, 2024 for corresponding PCT/US2024/038727.

* cited by examiner

AXIALLY ADJUSTABLE LENGTH RADIO FREQUENCY INTERCONNECT

BACKGROUND

Radio frequency (RF) interconnects are known in the art for use in antenna systems. RF high speed interconnection is used in many sensor products where signal transmission quality is an important factor in systems using high speed signals. An RF interconnect completes the path that connects one device to another. Many communication systems require numerous RF interconnect paths in sensor modules, RF modules to antennas, and between network devices.

Achieving maximum performance from RF communication systems require close attention to interconnect technology, circuit-to-circuit interconnections, and circuit design. RF interconnections are used in a variety of high speed applications such as communications devices, high speed computing, and sensors. In a communication system, signals travel through various interconnections from chip to package, package to board trace, and trace to high speed connectors. Any electrical discontinuity at the source end, on the transmission path, or at the receiving end, will affect the signal timing and quality. One of the primary uses of the RF interconnect is to relieve the stringent tolerance requirements imparted on components for a line-to-line interconnection.

SUMMARY

The following is a brief summary of subject matter that is described in greater detail herein. This summary is not intended to be limiting as to the scope of the claims.

In a first example, a radio frequency (RF) interconnect includes a main body defining an axis and threaded at a first end of the main body, the main body comprising a center conductor that extends along the axis, and wherein the center conductor is at least partially hollow. The RF interconnect includes a coupling nut having interior threads configured to be threadably coupled to the main body. The RF interconnect includes a first RF connector, wherein the first RF connector is adapted to be coupled to the coupling nut. The RF interconnect includes a floating pin, held by a surrounding dielectric material, that extends through a center aperture of the first RF connector and is electrically coupled to and moves axially within the center conductor of the main body. The RF interconnect includes a second RF connector at a second end of the main body.

According to a second example, a method of manufacturing an axially adjustable RF interconnect includes providing a main body defining an axis and threaded at a first end of the main body, the main body comprising a center conductor that extends along the axis, and wherein the center conductor is at least partially hollow. The method includes providing a coupling nut having interior threads configured to be threadably coupled to the main body. The method includes providing a first RF connector, wherein the first RF connector is adapted to be coupled to the coupling nut. The method includes providing a floating pin, held by a surrounding dielectric material, that extends through a center aperture of the first RF connector and is electrically coupled to and moves axially within the center conductor of the main body. The method includes providing a second RF connector at a second end of the main body.

In a third example, a system includes an antenna for receiving and transmitting communications data. The system includes a communications component comprising an RF module. The system includes an axially adjustable RF interconnect for coupling the antenna to the communications component, the axially adjustable RF interconnect comprising a main body defining an axis and threaded at a first end of the main body, the main body comprising a center conductor extends along the axis, and wherein the center conductor is at least partially hollow, a coupling nut having interior threads configured to be threadably coupled to the main body, a first RF connector, wherein the first RF connector is adapted to be coupled to the coupling nut, a floating pin, held by a surrounding dielectric material, that extends through a center aperture of the first RF connector and is electrically coupled to and moves axially within the center conductor of the main body, and a second RF connector at a second end of the main body.

BRIEF SUMMARY OF THE DRAWINGS

The general inventive concepts, as well as illustrative examples and advantages thereof, are described below in greater detail, by way of example, with reference to the drawings in which.

DETAILED DESCRIPTION

Figure 1:
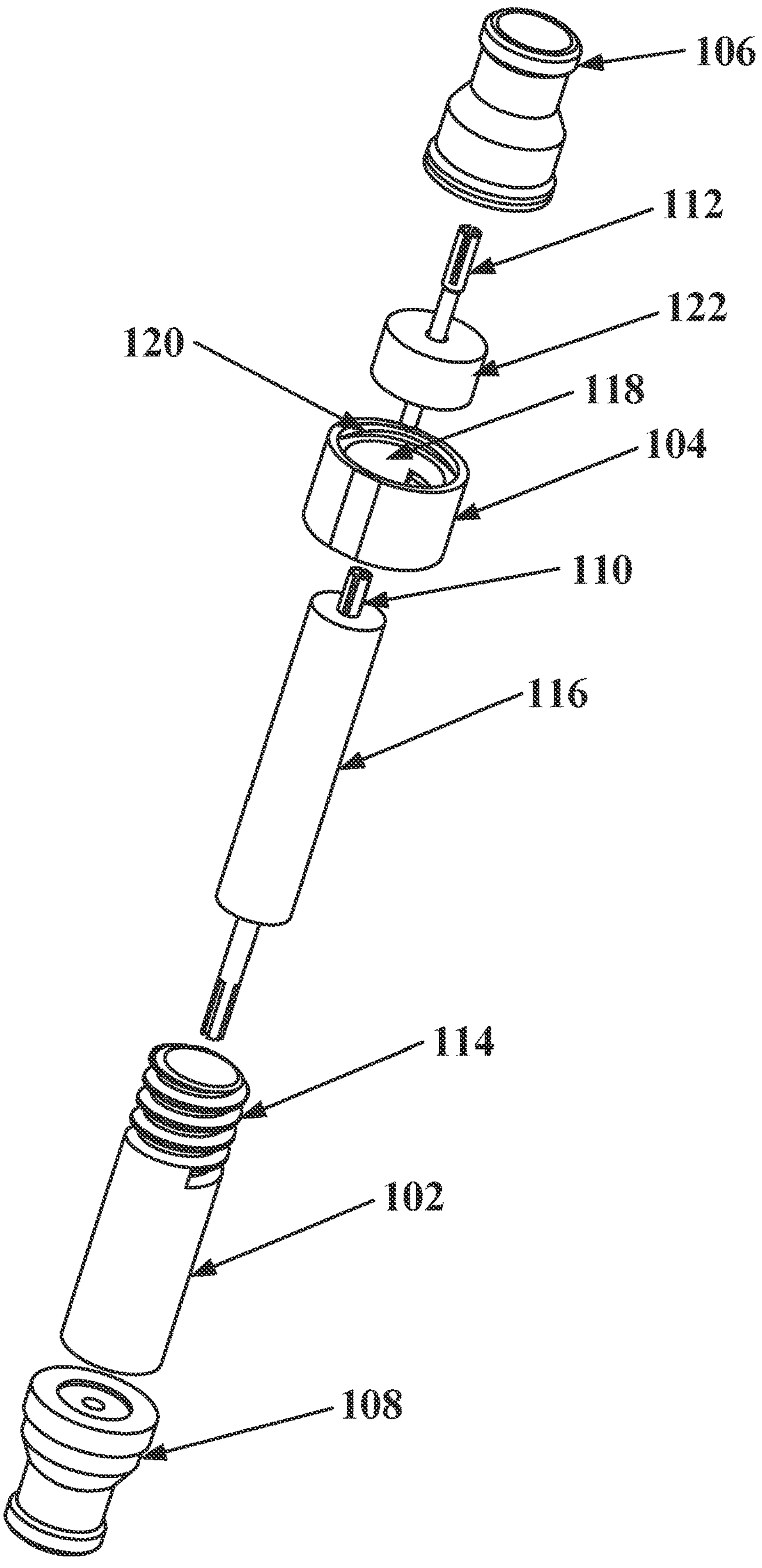
FIG. 1 illustrates an example of an exploded view of an RF interconnect.

The following detailed description is merely illustrative and is not intended to limit examples and/or application or uses of examples. Furthermore, there is no intention to be bound by any expressed or implied information presented in the preceding Background or Summary sections, or in the Detailed Description section.

As used in the specification and the appended claims, the singular forms "a," "an," and "the" are intended to include the plural forms as well, unless the context clearly indicates otherwise.

Unless otherwise indicated, any element, property, feature, or combination of elements, properties, and features, may be used in any example disclosed herein, regardless of whether the element, property, feature, or combination was explicitly disclosed in the example. It will be readily understood that features described in relation to any particular aspect described herein may be applicable to other aspects described herein provided the features are compatible with that aspect. In particular, features described herein in relation to the method may be applicable to the RF interconnect product and vice versa.

One or more examples are now described with reference to the drawings, wherein like referenced numerals are used to refer to like elements throughout. In the following description, for purposes of explanation, numerous specific details are set forth in order to provide a more thorough understanding of the one or more examples can be practiced without these specific details, or with other methods, components, materials, etc. In other instances, well-known structures, materials, or operations are not shown or described in detail to avoid obscuring certain aspects.

Reference throughout this specification to "one example," or "an example," means that a particular feature, structure, or characteristic described in connection with the example is included in at least one example. Thus, the appearances of the phrase "in one example," "in one aspect," or "in an example," in various places throughout this specification are not necessarily all referring to the same example. Furthermore, the particular features, structures, or characteristics may be combined in any suitable manner in one or more examples.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Referring to FIG. 1, there is illustrated an example of an exploded view of an axially adjustable length radio frequency (RF) interconnect 100 that can be used to connect an antenna or subcomponent to a component on a sensor platform vehicle such as an aircraft. The RF interconnect 100 can be used to transmit radio frequency signals for broadband telecommunications, military avionics, and microwave systems. As shown, the RF interconnect generally comprises a conductive hollow threaded shank to form a main body 102, a conductive coupling nut 104, a female RF connector 106, a female RF connector 108 that is machined as part of the main body 102 or pressed into and positioned at an end of the main body, a center conductor 110 extending along the center axis of the main body, and a secondary center conductor floating pin 112. The center conductor 110 can be physically and electrically coupled to the secondary center conductor floating pin 112 secondary conductor for use in connecting electrical components and/or carry data signals, such as RF signals. The RF interconnect 100 can be fabricated of beryllium copper (BeCu) or suitable metallic materials and can span the distance between a gap in two components to transfer the RF signal. For example, the RF interconnect 100 can be used as a transmission line to connect within avionics systems or sensors of the aircraft.

As shown within the example of FIG. 1, the main body 102 is a generally cylindrical structure having a threaded interface 114 at the opposite end of the female RF connector 108. The main body is preferably made from a metallic material, such as beryllium copper, brass, or stainless steel, and is preferably plated with a conductive, corrosion resistant material, such as gold or nickel. An insulating dielectric material 116 (e.g., polyethylene, foam polyethylene, or Teflon) surrounds the center conductor 110 along the length of the main body 102 to electrically insulate the center conductor 110. The female RF connector 106 and the conductive coupling nut 104 are coaxially aligned to the main body 102 comprising the female RF connector 108. The center conductor 110 is partially hollow at the end with compression force features like bifurcations to receive the secondary center conductor floating pin 112 at a suitable depth which allows for the length of the RF interconnect 100 to be adjusted so that the female RF connector 106 and the female RF connector 108 translate axially without losing electrical contact.

The conductive coupling nut 104 is preferably made from a metallic material, such as brass, beryllium copper, or stainless steel, and is preferably plated with a conductive, corrosion resistant material, such as gold or nickel. The coupling nut includes threads (not shown) to engage the threaded interface 114 of the main body 102. The conductive coupling nut 104 has a relatively short length and can be grasped by a person's fingers or tool to be tightened or loosened. In order to maintain a tight electrical connection, and to achieve the intended electrical performance, an RF connector must be securely tightened to an attachment structure. However, a number of factors, including vibration and thermal cycling, can cause the connector to loosen and/or separate, resulting in signal loss or degradation of electrical performance. The rotation of the conductive coupling nut 104 causes the secondary center conductor floating pin 112 to axially translate within the receiving features of the center conductor 110 to achieve the necessary length to remove gaps and alleviate the axial misalignment between components. Once the desired length is set, epoxy or other staking agent material can be applied to the conductive coupling nut 104 to lock the position.

The conductive coupling nut 104 includes an inner surface 118 defining a threaded cavity through which the female RF connector 106 is received. The inner surface 118 includes a lip 120 to accept a snap on attachment to the female RF connector 106 which allows for the conductive coupling nut 104 to rotate freely from the female RF connector 106. When the main body 102 is threaded into the conductive coupling nut 104 and the secondary center conductor floating pin 112 is inserted into the center conductor 110 of the main body 102, a gripping member (not shown) on the inner surface 118 of the conductive coupling nut 104 is compressed against the secondary center conductor floating pin 112 and maintains a tension force between the secondary center conductor floating pin 112 and the main body 102 to help prevent their separation from, for example, vibration and thermal cycling. The gripping member (not shown) includes a plurality of protrusions extending from the inner surface 118 of the conductive coupling nut 104.

The secondary center conductor floating pin 112 can be mated with the center conductor 110 of the main body 102. The floating pin is disposed within the cavity of the conductive coupling nut 104. The floating pin conductor is preferably made from a metallic material, such as beryllium copper, and is preferably plated with a conductive, corrosion resistant material, such as gold. A dielectric material 122 is disposed around a portion of the secondary center conductor floating pin 112 to hold the pin in place and prevent connection from the RF connector outer body. The floating pin can extend through an aperture (not shown) of the female connector 106 and electrically connects with a component for passing signals between the secondary center conductor floating pin 112 and the center conductor 110 of the main body 102. Thus, the RF interconnect 100 allows for mating of the female RF connector 106 and the female RF connector 108 to corresponding receptacle assemblies once the corresponding receptacle assemblies are precisely aligned. Rotation of the conductive coupling nut 104 lengthens or shortens the RF interconnect axially by allowing the secondary center conductor floating pin 112 to translate (not rotate) within the center conductor 110 of the main body 102. By utilizing the adjustable length RF interconnect 100 in place of a fixed length RF interconnect, a more precise and reliable electrical connection can be realized.

Figure 2:
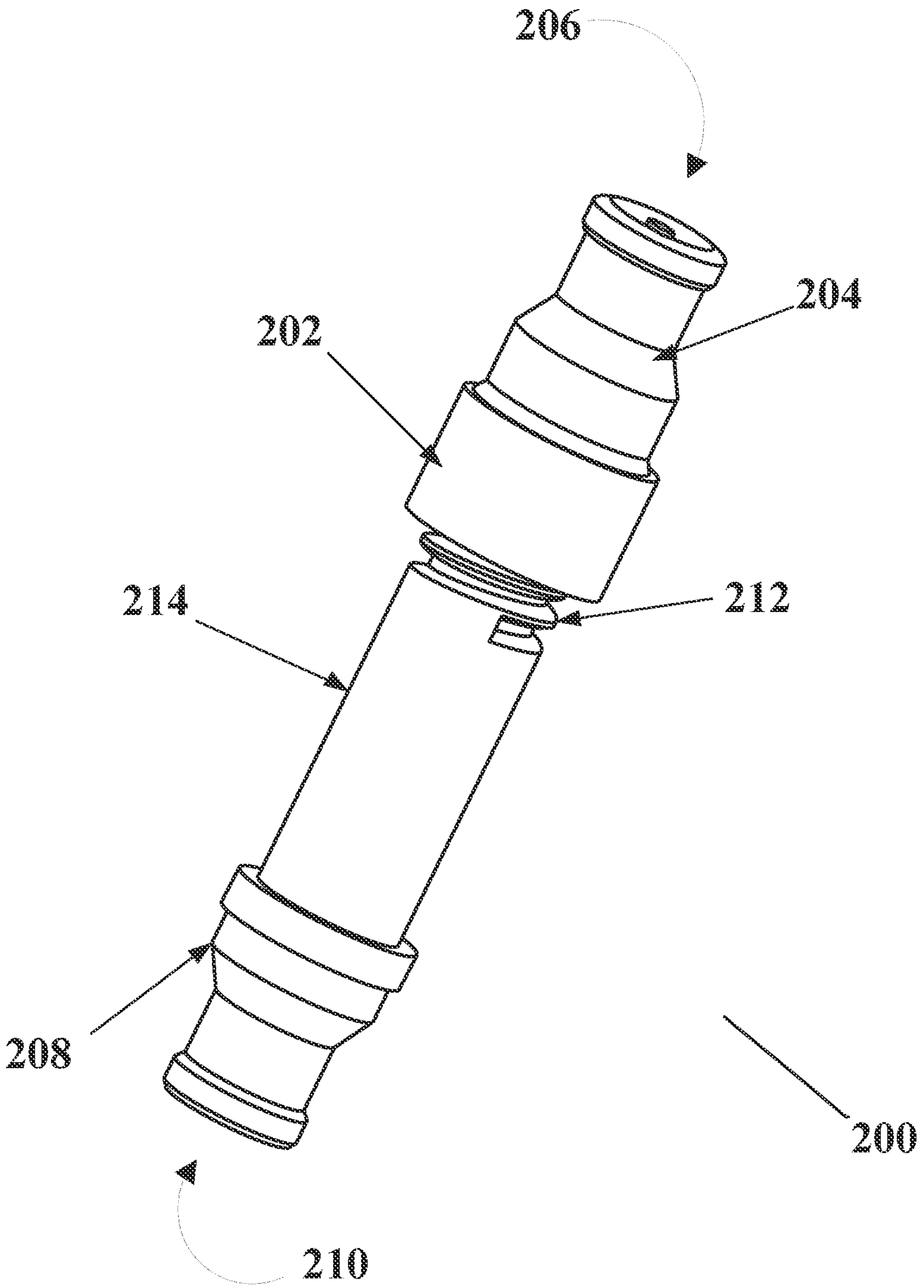
FIG. 2 illustrates an example of a perspective view of an RF interconnect.

Turning now to FIG. 2, the RF interconnect 200 forms an axially adjustable length transmission line. This enables an installer to attach transversely disposed components, not shown in FIG. 2, to each end of the RF interconnect 200. Due to the dimensions of the space between the components, the installer rotates the coupling nut 202 to extend the longitudinal extent of the RF interconnect 200. The RF interconnect 200 has a first RF connector 204 at a first end 206 and a second RF connector 208 at a second end 210. The RF connectors 204, 208 can be any coaxial adapter (e.g., SMP, SMPM, SMPS, SMA, SMB, BNC, TNC, MCX, or any other suitable adapter). The RF interconnect 200 extends between respective pairs of oppositely facing RF ports (not shown) which define each of the respective RF connectors 204, 208.

In some examples, the length of at least some of the parts of the RF interconnect 200 may depend on the separation between the components. The length of the threaded interface 212 of the main body 214 depends on the amount of tolerance needed to span the gap of axial misalignment. The rotational movement of the coupling nut 202 advances the length of the RF interconnect 200. Thus, the threaded interface 212 can be fine pitched to provide for fine axial length adjustment. The main body 214 includes a male threaded end that mates with a female threaded interior of the coupling nut 202. Rotating/turning the coupling nut 202 clockwise would thread the coupling nut 202 onto the threaded interface 212 until the coupling nut abuts into the main body 214, shortening the RF interconnect 200. Rotating/turning the coupling nut 202 counter-clockwise would pull the first RF connector 204 away from the second RF connector 208, lengthening the RF interconnect 200.

Not shown in FIG. 2, but understood, the floating pin is inserted into and electrically connected to the receiving features of the center conductor of the main body 214. The floating pin and surrounding dielectric material are held within the body portion of the RF connector 204 and the floating pin passes through the cavity of the coupling nut 202. Once the floating pin is inserted into the receiving features of the main body 214 center conductor, the floating pin may be gripped by a gripping member to alleviate slipping of the floating pin. Once assembled, the installer can grip (e.g., by a wrench) the coupling nut 202 to be rotated for lengthening or shortening of the RF interconnect 200.

Figure 3:
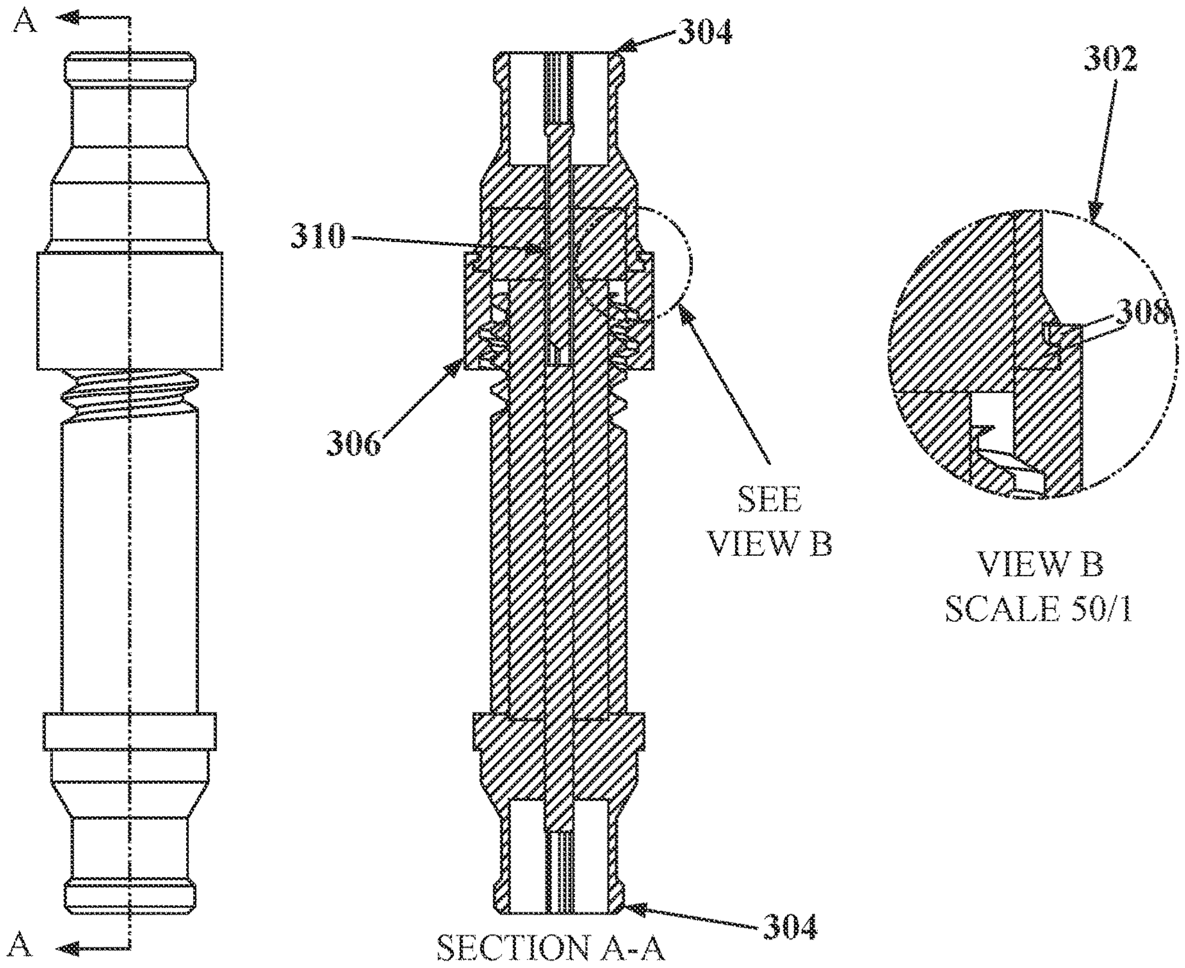
FIG. 3 illustrates an example of an expanded view of an RF connector assembly.

Turning now to the example of FIG. 3, a RF connector assembly 300 is shown where a snap-on, quick connect method can be used. This arrangement is a combination of an RF connector 302 and a coupling nut 304 by simply pushing in without rotation between each other. When the quick connect, quick release and snap-on connectors are fully interlocked, the RF connector 302 is received in grooves or recesses on the coupling nut 304. The RF connector 302 and the coupling nut 304 are not locked when they are mated together. The coupling nut 304 can rotate freely from the rotation of the RF connector 302.

In a preferred example of the RF connector assembly 300, two molded collar features 302 are fashioned to the outside portion of the RF connector 304 and the inside portion of the coupling nut 306. The RF connector 304 and the coupling nut 306 can be snapped or snapped together in an enclosing relationship so that the coupling nut holds the RF connector captured yet still allowing free axial rotation motion. The example is not limited to the molded shape shown in FIG. 3. As shown in FIG. 3, the RF connector 304 and the coupling nut 306 have a pair of snap retention features 308, which are locked when the RF connector 304 and the coupling nut 306 partially surround the floating pin 310. The floating pin 310 is held in the cavity of the RF connector 304 by means of capture of the dielectric material surrounding the floating pin 310. In this way, when the coupling nut 306 is rotated back and forth with respect to the RF connector 304, the RF connector assembly 300 has a restoring force to maintain the RF connector 304 and the coupling nut 306 in the neutral position. The snap retention features 308 prevents deformation of the RF connector assembly 300. However, the axial movement of the coupling nut 306 provides clearance for the outward deformation of the floating pin 310 so that the RF connector 304 can be engaged or released from the mating or matching RF port.

Figure 4:
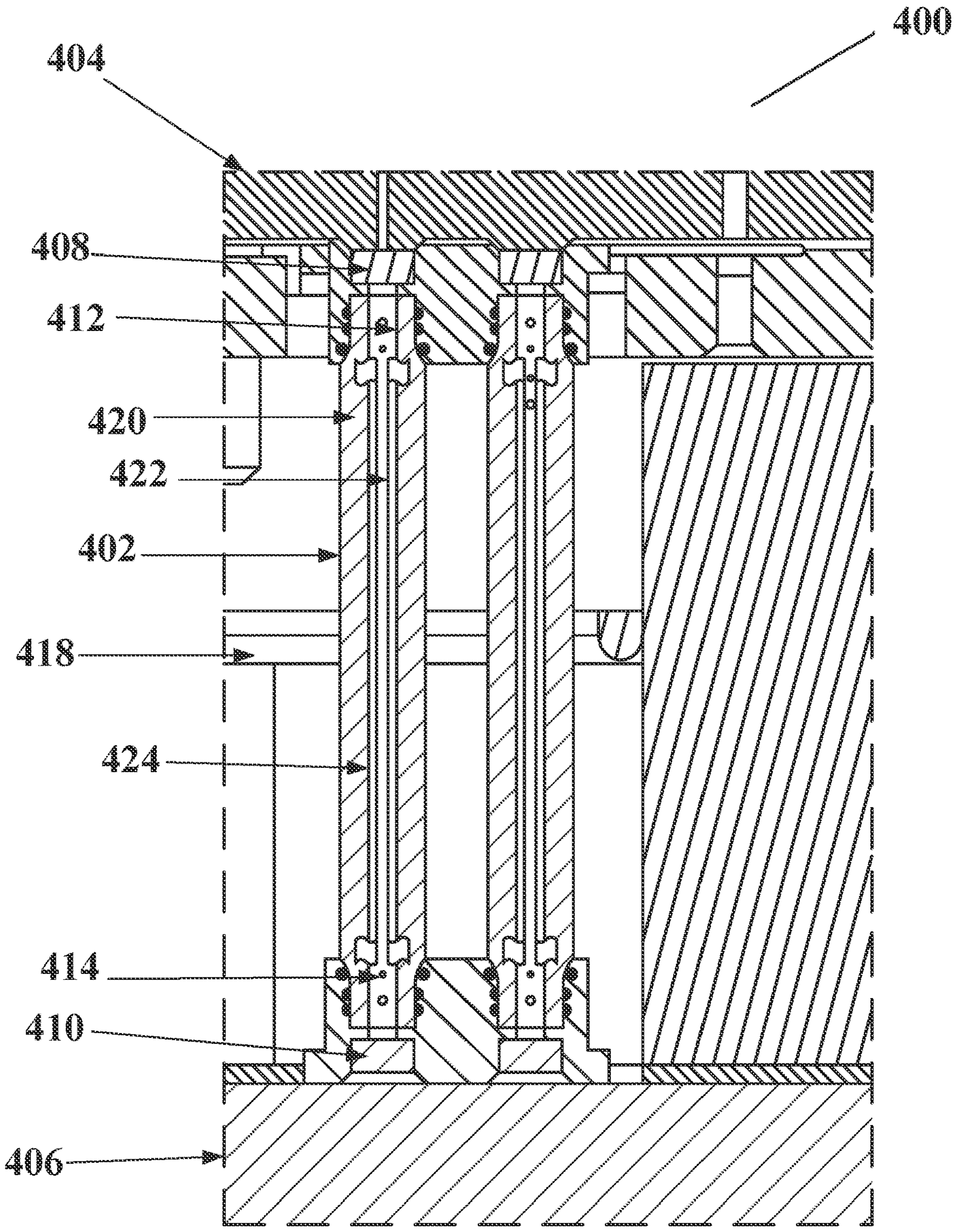
FIG. 4 illustrates an example of the mounting of a RF interconnect.

Turning now to the example of FIG. 4, a mounting of an RF interconnect 400 is shown, the RF interconnect 402 allows radio frequency signals to traverse a gap by a coupling process between a first component 404 and a second component 406, as discussed in greater detail herein. The RF interconnect allows mating of the first component 404 and the second component 406 even if the first RF port 408 of the first component 404 and the second RF port 410 of the second component 406 are not precisely aligned. In this manner, damage to the first component 404 or the second component 406 is avoided when misalignment occurs. In addition, costly re-manufacturing or re-design of systems utilizing mated electrical connections is reduced since the error tolerance in lining up the mating portions is increased. By utilizing an axially adjustable length RF interconnect 402 in place of a fixed length RF interconnect for facilitating electrical conductivity, a more reliable electrical connection may be realized, with lower signal loss and degradation of electrical performance than can otherwise be obtained.

The RF interconnect 402 includes a first RF connector 412 and a second RF connector 414 that are fixedly engaged with the first RF port 408 of the first component 404 and the second RF port 410 of the second component 406. Thus, the RF interconnect 402 provides a mechanical connection for maintaining axial alignment of the first component 404 and the second component 406, independent of a mounting structure 418. Such a connection also maintains electrical conductivity between the first component 404 and the second component 406 and allows the RF interconnect 402 the ability to be adjusted without needing to adjust the entire system configuration. This configuration also aids in preventing dust, moisture, or other environmental elements from entering the first RF port 408 of the first component 404 and the second RF port 410 of the second component 406. The RF interconnect 402 prevents angling and/or shifting of a central axis of the system when connected, as seen in greater detail herein.

The first RF connector 412 and the second RF connector 414 of the RF interconnect 402 can be configured to rigidly secure and make electrical contact with the first RF port 408 of the first component 404 and the second RF port 410 of the second component 406, respectively. The first RF connector 412 and the second RF connector 414 have a plurality of protrusions (not shown) or conductive elements extending outwardly for making electrical connection with the first RF port 408 and the second RF port 410. For example, the protrusions (not shown) may be used for carrying a ground signal between ground lines on the RF ports (408, 410). The protrusions (not shown) may be used for carrying an electrical signal between the components (404, 406), through the RF interconnect 402 for connection to a corresponding plug assembly.

The RF interconnect 402 includes an outer conductor 420 that defines a cavity containing a transmission line 422 having a floating pin (not shown) therein. The outer conductor may be made of a variety of conductive materials (e.g., copper) for carrying an electrical signal. In an alternative implementation, the outer conductor 420 can replaceably be a non-conductive outer body of the RF interconnect 402 if it is not desired to propagate or transmit electrical signals therealong. The transmission line 422 is disposed within the cavity defined by the outer conductor 420 and is electrically connected with the outer conductor 420 for providing a surface for an outer conductor of the RF connectors (412, 414) to contact during mating. The transmission line 422 in accordance with various implementations may comprise multiple components, such as a floating pin (not shown) and a hollowed center conductor (not shown) through which the floating pin may axially translate. The RF Interconnect 402 provides an extendable, conductive surface for the RF connectors (412, 414) to span a gap in order align the first component 404 with the second component 406. Thus, the connection wear that can otherwise occur if a fixed length RF interconnect were used in place of the axially adjustable length RF interconnect 402 is avoided and the durability of the RF ports (408, 410) is dramatically extended. A dielectric material 424 is also disposed within the cavity defined by the outer conductor 420 and is configured to have a first portion surrounding the hollowed central conductor and a second portion surrounding the floating pin when mated with the RF ports (408, 410).

Figure 5:
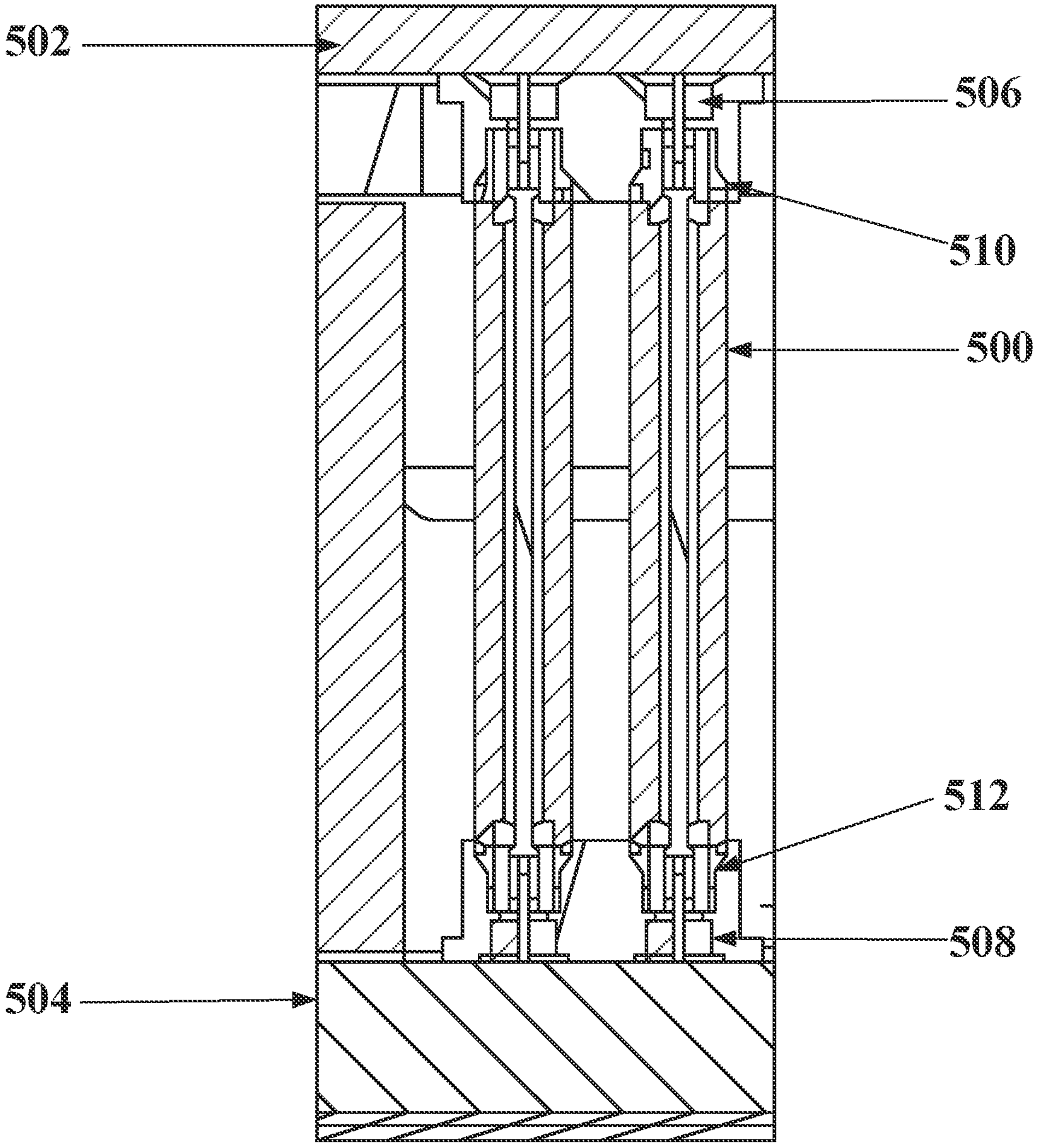
FIG. 5 illustrates another example of the mounting of a RF interconnect.

In the example of FIG. 5, the axially adjustable length RF interconnect 500 is shown during a final state of the mating process, i.e., fully mated. The first component 502 and the second component 504 is now in axial alignment. Neither the first port 506 of the first component 502 nor the second port 508 of the second component 504 has shifted or put under strain during the mating of a misaligned fixed length RF interconnect. Instead, the misalignment between the first component 502 and the second component 504 has been accommodated by extending the length of the axially adjustable length RF interconnect 500 with respect to the first port 506 of the first component 502 and the second port 508 of the second component 504.

Although the implementations previously described have shown various connector components as integrated or coupled to a connector, the genders of each RF connector (506, 508) may be reversed. An alternative implementation may also utilize greater or fewer connector components than have been described for the implementations above. In one example a coupling nut and/or floating pin may be utilized in both ends or either end of the axially adjustable length RF interconnect 500 for allowing movement of a portion of the axially adjustable length RF interconnect 500.

Figure 6:
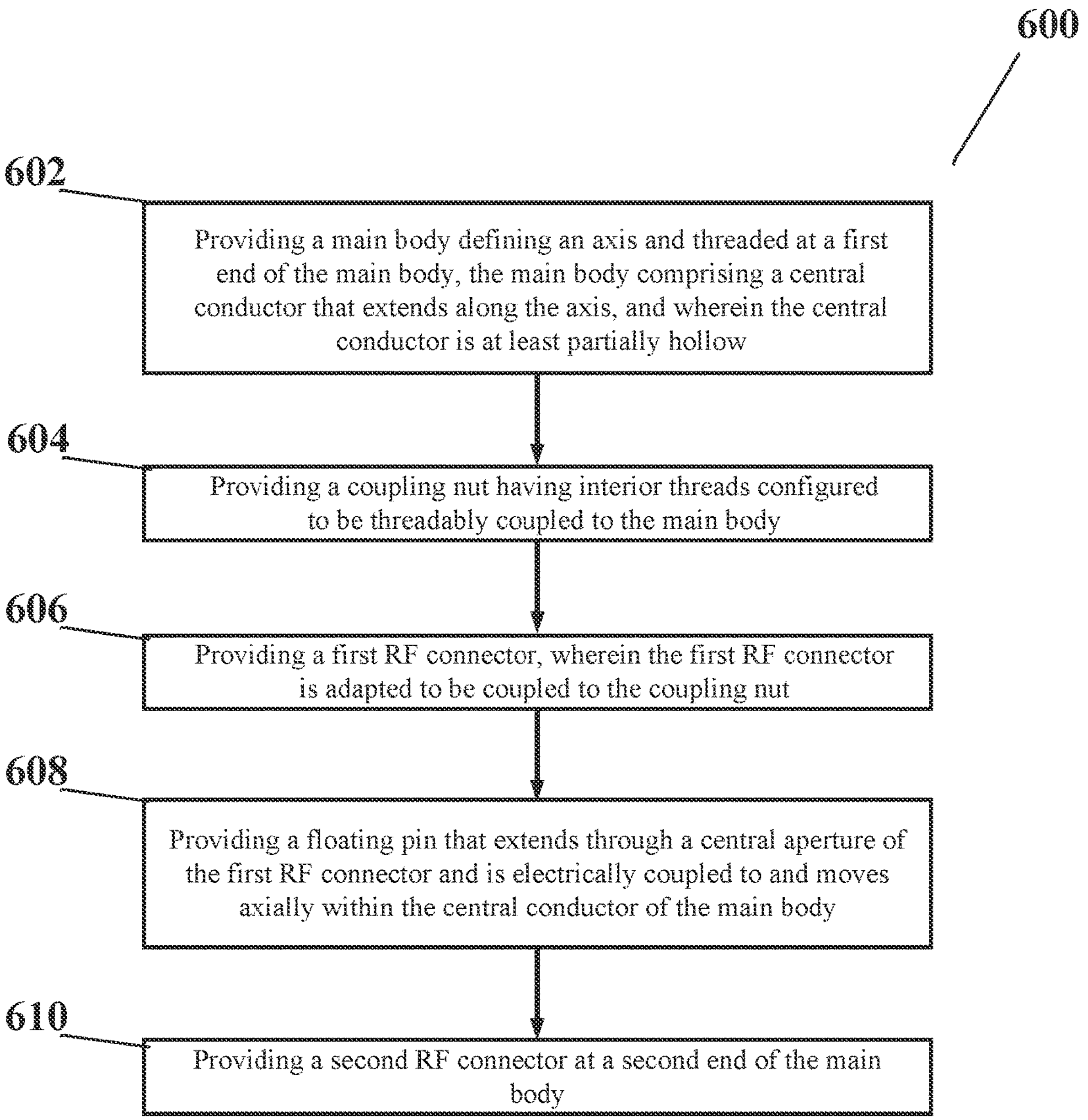
FIG. 6 illustrates an example of flow diagram for manufacturing an axially adjustable RF interconnect.

Referring now to the example of FIG. 6, illustrated is a flow diagram 600 for manufacturing an axially adjustable RF interconnect in accordance with one or more examples described herein.

At 602, the flow diagram comprises providing a main body defining an axis and threaded at a first end of the main body, the main body comprising a central conductor that extends along the axis, and wherein the central conductor is at least partially hollow.

At 604, the flow diagram comprises providing a coupling nut having interior threads configured to be threadably coupled to the main body.

At 606, the flow diagram comprises providing a first RF connector, wherein the first RF connector is adapted to be coupled to the coupling nut.

At 608, the flow diagram comprises providing a floating pin that extends through a central aperture of the first RF connector and is electrically coupled to and moves axially within the central conductor of the main body.

At 610, the flow diagram comprises providing a second RF connector at a second end of the main body.

The manufacturing the axially adjustable RF interconnect can further comprise providing a coupling nut that is axially adjustable to lengthen or contract the RF interconnect between circuits to mitigate axial misalignment, wherein the first RF connector and the second RF connector axially translate, and wherein the coupling nut turns independently of the first RF connector and the second RF connector.

The manufacturing the axially adjustable RF interconnect can further comprise providing the floating pin that moves axially upon the axial adjusting of the coupling nut.

The manufacturing the axially adjustable RF interconnect can further comprise providing a gripping member for gripping the floating pin at an outer surface thereof, wherein the floating pin remains electrically coupled to the central conductor of the main body upon the axial adjusting of the RF interconnect.

The manufacturing the axially adjustable RF interconnect can further comprise providing the gripping member configured to be displaced radially inward when the floating pin is forced into the central conductor of the main body.

The above description includes non-limiting aspects of the various examples. It is, of course, not possible to describe every conceivable combination of components or methods for purposes of describing the disclosed subject matter, and one skilled in the art may recognize that further combinations and permutations of various examples are possible. The disclosed subject matter is intended to embrace all such alterations, modifications, and variations that fall within the spirit of the appended claims.

With regard to the various functions performed by the above described components, the terms (including a reference to a "means") used to describe such components are intended to also include, unless otherwise indicated, any structure(s) which performs the specified function of the described component (e.g., functional equivalent), even if not structurally equivalent to the disclosed structure. In addition, while a particular feature of the disclosed subject matter may have been disclosed with respect to only one of several implementations, such feature may be combined with one or more features of the other implementations as may be desired and advantageous for any given or particular applications.

The terms "exemplary" and/or "demonstrative" as used herein are intended to mean serving as an example, instance, or illustrative. For the avoidance of doubt, the subject matter disclosed herein is not limited to such examples. In addition, any aspect or design described herein as "exemplary" and/or "demonstrative" is not necessarily to be construed as preferred or advantageous over the other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The description of illustrated examples of the subject disclosure as provided herein, including what is described in the Abstract, is not intended to be exhaustive or to limit the disclosed examples to the precise forms disclosed. While specific examples are described herein for illustrative purposes, various modifications are possible that are considered within the scope of such examples, as one skilled in the art can recognize. In this regard, while the subject matter has been described herein in connection with various examples and corresponding drawings, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

What is claimed is:

1. A radio frequency (RF) interconnect comprising:
- a main body defining an axis and threaded at a first end of the main body, the main body comprising a central conductor that extends along the axis, and wherein the central conductor is at least partially hollow;
- a coupling nut having interior threads configured to be threadably coupled to the main body;
- a first RF connector, wherein the first RF connector is adapted to be coupled to the coupling nut;
- a floating pin, held by a surrounding dielectric material, that extends through a central aperture of the first RF connector and is electrically coupled to and moves axially within the central conductor of the main body; and
- a second RF connector at a second end of the main body.

2. The RF interconnect of claim 1, wherein the coupling nut is axially adjusted to extend or contract the length of the RF interconnect between circuits to mitigate variations in axial lengths and tolerances, wherein the first RF connector and the second RF connector axially translate, and wherein the coupling nut turns independently of the first RF connector and the second RF connector.

3. The RF interconnect of claim 2, wherein the floating pin and the main body translates axially upon the axial adjusting by rotating the coupling nut.

4. The RF interconnect of claim 2, wherein the floating pin remains electrically coupled to the central conductor of the main body upon the axial adjusting of the RF interconnect.

5. The RF interconnect of claim 1, wherein a first lip is formed on the interior side of the coupling nut at an end of the coupling nut, and wherein a second lip is formed on an exterior wall at an end of the first RF connector, wherein the first RF connector snaps on to the coupling nut.

6. The RF interconnect of claim 5, wherein the first RF connector is a female-threaded end.

7. The RF interconnect of claim 1, wherein the second RF connector is a female-threaded end configured to be pressed on or machined into the main body.

8. The RF interconnect of claim 1, wherein the coupling nut locks the first RF connector and the second RF connector at a fixed length.

9. The RF interconnect of claim 8, wherein epoxy is applied to the coupling nut to stake or fasten the coupling nut to the main body.

10. A method of manufacturing an axially adjustable RF interconnect, the method comprising:
- providing a main body defining an axis and threaded at a first end of the main body, the main body comprising a central conductor that extends along the axis, and wherein the central conductor is at least partially hollow;
- providing a coupling nut having interior threads configured to be threadably coupled to the main body;
- providing a first RF connector, wherein the first RF connector is adapted to be coupled to the coupling nut;
- providing a floating pin, held by a surrounding dielectric material, that extends through a central aperture of the first RF connector and is electrically coupled to and moves axially within the central conductor of the main body; and
- providing a second RF connector at a second end of the main body.

11. The method of claim 10, wherein the coupling nut is axially adjustable to lengthen or contract the RF interconnect between circuits to mitigate axial misalignment, wherein the first RF connector and the second RF connector axially translate, and wherein the coupling nut turns independently of the first RF connector and the second RF connector.

12. The method of claim 11, wherein the RF interconnect of claim 11, wherein the floating pin moves axially upon the axial adjusting of the coupling nut.

13. The method of claim 11, wherein the floating pin remains electrically coupled to the central conductor of the main body upon the axial adjusting of the RF interconnect.

14. A system comprising:
- an antenna for receiving and transmitting communications data;
- a communications component comprising a radio frequency (RF) module; and
- an axially adjustable RF interconnect for coupling the antenna to the communications component, the axially adjustable RF interconnect comprising:
  - a main body defining an axis and threaded at a first end of the main body, the main body comprising a central conductor extends along the axis, and wherein the central conductor is at least partially hollow,
  - a coupling nut having interior threads configured to be threadably coupled to the main body,
  - a first RF connector, wherein the first RF connector is adapted to be coupled to the coupling nut,
  - a floating pin, held by a surrounding dielectric material, that extends through a central aperture of the first RF connector and is electrically coupled to and moves axially within the central conductor of the main body, and
  - a second RF connector at a second end of the main body.

15. The system of claim 14, wherein the coupling nut is axially adjusted to lengthen or contract the RF interconnect between circuits to mitigate axial misalignment, wherein the first RF connector and the second RF connector axially translate, and wherein the coupling nut turns independently of the first RF connector and the second RF connector.

16. The system of claim 15, wherein the floating pin and the main body moves axially upon the axial adjusting by rotating of the coupling nut.

17. The system of claim 15, wherein the floating pin remains electrically coupled to the central conductor of the main body upon the axial adjusting of the RF interconnect.

* * * * *